US009184995B2

(12) United States Patent
Leong

(10) Patent No.: US 9,184,995 B2
(45) Date of Patent: Nov. 10, 2015

(54) TRAFFIC VISIBILITY IN AN OPEN NETWORKING ENVIRONMENT

(75) Inventor: Patrick Pak Tak Leong, Palo Alto, CA (US)

(73) Assignee: Gigamon Inc., Santa Clara, CA (US)

( * ) Notice: Subject to any disclaimer, the term of this patent is extended or adjusted under 35 U.S.C. 154(b) by 519 days.

(21) Appl. No.: 13/444,609

(22) Filed: Apr. 11, 2012

(65) Prior Publication Data

US 2013/0272135 A1    Oct. 17, 2013

(51) Int. Cl.
*G01R 31/08*    (2006.01)
*H04L 12/24*    (2006.01)
*H04L 12/26*    (2006.01)

(52) U.S. Cl.
CPC ........ *H04L 41/0823* (2013.01); *H04L 41/0803* (2013.01); *H04L 41/0853* (2013.01); *H04L 43/062* (2013.01)

(58) Field of Classification Search
CPC ............................ H04L 45/021; H04L 43/026
USPC ........................................................ 370/235
See application file for complete search history.

(56) References Cited

U.S. PATENT DOCUMENTS

| | | | |
|---|---|---|---|
| 2004/0030766 A1 | 2/2004 | Witkowski | |
| 2006/0047800 A1 | 3/2006 | Caveney et al. | |
| 2012/0051229 A1* | 3/2012 | Feldmann et al. | 370/242 |
| 2012/0084368 A1* | 4/2012 | Go et al. | 709/206 |
| 2013/0071116 A1* | 3/2013 | Ong | 398/45 |
| 2013/0114615 A1* | 5/2013 | Suemitsu et al. | 370/401 |
| 2013/0151690 A1* | 6/2013 | Shah et al. | 709/224 |
| 2013/0188489 A1* | 7/2013 | Sato | 370/235 |
| 2013/0346585 A1* | 12/2013 | Ueno | 709/223 |

OTHER PUBLICATIONS

International Search Report and Written Opinon dated Jul. 1, 2013, for PCT Patent Application No. PCT/US2013/036230, 16 pages.
Vujosevic, P. "Investigation and validation of the OpenFlow protocol for next generation converged optical networks" Jun. 2011, 100 pages url: http://upcommons.upc.edu/pfc/bitstream/2099.1/12760/1/Master_Thesis_Report.pdf.
Matthew, W. "WML Appliance Manager" 2011, 2 pages url: http://wmltd.co.uk/uploads/images/wmlmarketing/literature/brochures/module_ApplianceManager/WMLOverview-ApplianceManager.pdf.

* cited by examiner

*Primary Examiner* — Shaq Taha
(74) *Attorney, Agent, or Firm* — Perkins Coie LLP

(57) ABSTRACT

A method of monitoring network traffic includes accessing a network that includes a controller and a switch device having a flow table, wherein the controller is communicatively coupled to the switch device, and is configured to program a behavior of the switch device through an openflow protocol, and obtaining information regarding the programmed behavior of the switch device, wherein the act of obtaining the information is performed by a network appliance that is communicatively coupled to the network. An apparatus communicatively coupled to a network, includes a processor configured for accessing the network that includes a controller and a switch device having a flow table, wherein the controller is communicatively coupled to the switch device, and is configured to program a behavior of the switch device through an openflow protocol, and obtaining information regarding the programmed behavior of the switch device.

56 Claims, 5 Drawing Sheets

TRAFFIC VISIBILITY IN AN OPEN NETWORKING ENVIRONMENT

FIELD

This application relates generally to network switch devices, and more specifically, to systems and methods for providing traffic visibility in an open networking environment.

BACKGROUND

In a classical switch or router, the packet forwarding path (the data path) and the high level routing/forwarding decisions (the control path) are in the same device. The data path may be implemented using one or more hardware chips, such as ASICs or FPGAs, and the control path may be implemented via software running on a CPU that communicates with the data path's hardware chip(s) to configure flow-tables in the switch, typically in the form of TCAMs associated with these ASICs or FPGAs. Once a TCAM table is set up by the software, packets along the data path can be forwarded via the hardware chips at line rate.

In some cases, it may be difficult for researchers to experiment new protocols in a large scale utilizing existing commercial switches and routers in the Internet. This is because existing switches and routers are specifically configured to operate based on standard protocol. Also, the configuring of existing switches and routers may involve proprietary software and/or algorithms that are known only to the vendors of the switches and routers. Without knowing such proprietary software and algorithms, it would be impossible to configure the switch or router so that it will behave in a certain desired manner. Sometimes, a switch may have a management interface that allows a user to perform simple management tasks on the switch. However, such management interface has very limited use, and does not allow the user to modify the behavior of the switch (such as by changing one or more entries in a flow table in the switch), and certainly cannot be used to configure the switch to make it operate based on non-standard protocol.

SUMMARY

In accordance with some embodiments, an open standard (openflow protocol) may be implemented that allows different users to modify the behavior of a switch device. By means of non-limiting examples, the switch device may be a switch, a router, a virtual switch, an access point, etc. In some embodiments, the switch device may be configured to support the openflow protocol. Using the openflow protocol, the different users may control the flow table(s) in the switch device from one or more external devices (e.g., controller(s)).

In some embodiments, a method of monitoring network traffic in a network that involves openflow protocol is provided.

In accordance with some embodiments, a method of monitoring network traffic includes accessing a network that includes a controller and a switch device having a flow table, wherein the controller is communicatively coupled to the switch device, and is configured to program a behavior of the switch device through an openflow protocol, and obtaining information regarding the programmed behavior of the switch device, wherein the act of obtaining the information is performed by a network appliance that is communicatively coupled to the network.

In some embodiments, an apparatus for monitoring network traffic in a network that involves openflow protocol is provided.

In accordance with some embodiments, an apparatus communicatively coupled to a network, includes a processor configured for accessing the network that includes a controller and a switch device having a flow table, wherein the controller is communicatively coupled to the switch device, and is configured to program a behavior of the switch device through an openflow protocol, and obtaining information regarding the programmed behavior of the switch device.

Other and further aspects and features will be evident from reading the following detailed description of the embodiments.

BRIEF DESCRIPTION OF THE DRAWINGS

The drawings illustrate the design and utility of embodiments, in which similar elements are referred to by common reference numerals. These drawings are not necessarily drawn to scale. In order to better appreciate how the above-recited and other advantages and objects are obtained, a more particular description of the embodiments will be rendered, which are illustrated in the accompanying drawings. These drawings depict only typical embodiments and are not therefore to be considered limiting of its scope.

DESCRIPTION OF THE EMBODIMENTS

Figure 1:
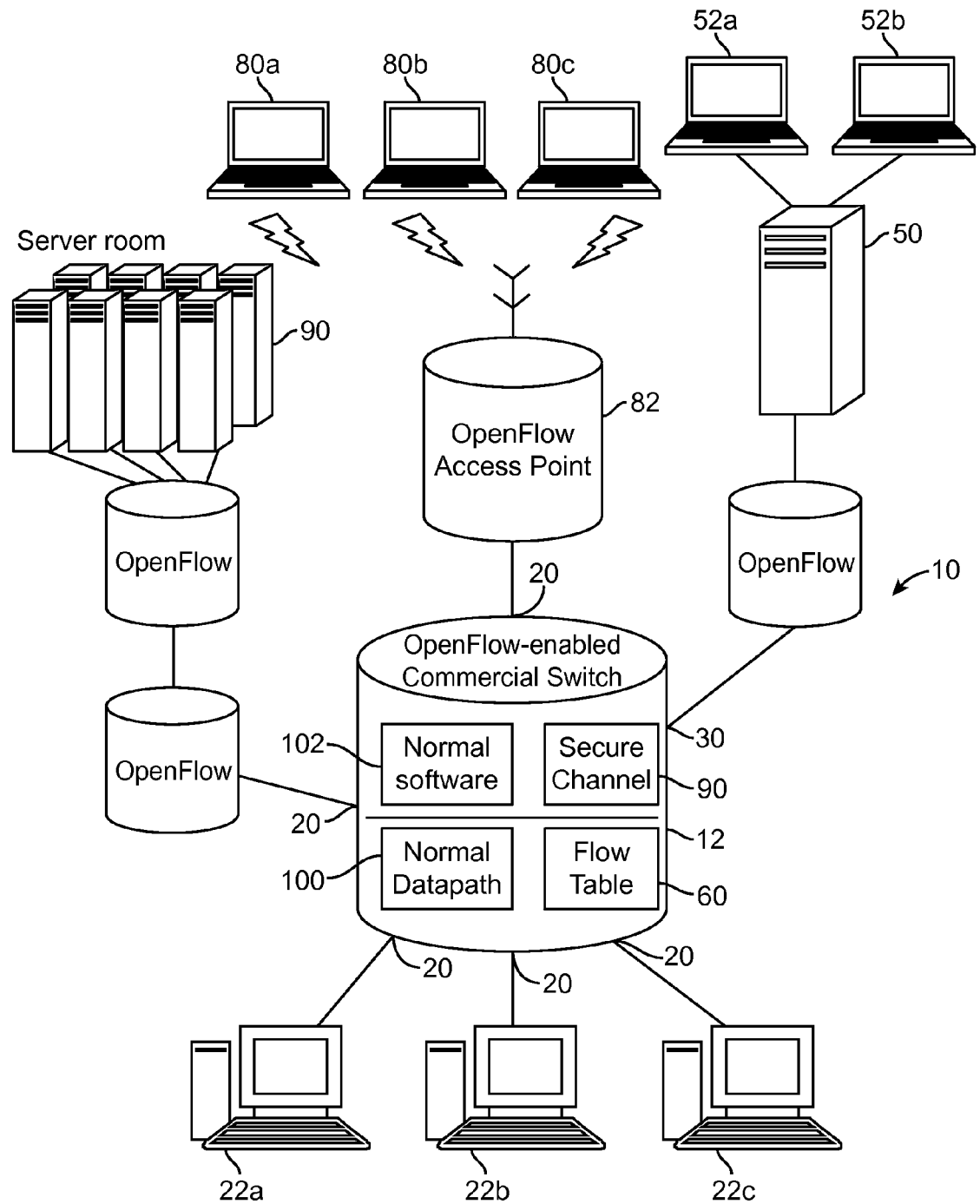
FIG. 1 illustrates a network in accordance with some embodiments.

Various embodiments are described hereinafter with reference to the figures. It should be noted that the figures are not drawn to scale and that elements of similar structures or functions are represented by like reference numerals throughout the figures. It should also be noted that the figures are only intended to facilitate the description of the embodiments. They are not intended as an exhaustive description of the invention or as a limitation on the scope of the invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated.

FIG. 1 illustrates a network 10 in accordance with some embodiments. The network 10 includes a switch device 12. The switch device 12 includes a plurality of network ports 20 for communication with different nodes 22a-22c, and a configuration port 30 for allowing one or more users to configure the switch device 12. Although three network ports 20 are shown, in other embodiments, the switch device 12 may have fewer than three network ports 20 or more than three network ports 20. Also, although one configuration port 30 is shown, in other embodiments, the switch device 12 may include more than one configuration port 30.

As shown in the figure, the switch device 12 may be configured by a controller 50, which is communicatively coupled to the switch device 12. In the illustrated embodiments, the controller 50 communicates with the switch device 12 through an openflow protocol, and is configured to program a behavior of the switch device 12 through the openflow protocol. As used in this specification, the term "openflow protocol" or similar terms, such as "open standard", refers to a protocol in which user(s) (besides a provider of a switch device and/or a network administrator) may have access to configure a switch device, such as to program a behavior of the switch device 12 by modifying flow table(s) 60 therein. In some embodiments, a flow table may include one or more flow entry, and one or more action associated with each flow entry, wherein each action is configured to tell the switch device 12 how to process a flow. By means of non-limiting examples, the action may be (a) forwarding packet(s) to another flow table, or (b) sending packet(s) out of the switch device 12 through one or more egress ports (which may take place at line rate), (c) encapsulating and forwarding packet(s) to an external controller (for example, such may be used for the first packet of each new packet flow so that the controller may decide if a new flow entry should be added to the flow table); (d) dropping packets, (e) rewriting portions of a packet header, (f) mapping packet(s) of a flow to a specific priority class, etc. In some embodiments, statistics counters may be implemented for each flow entry. A flow table 60 may be modified by adding information, deleting information, changing information, etc., therein. Although only one controller 50 is shown, in other embodiments, there may be more than one controller 50. In some embodiments, the controller may be implemented using a computer (e.g., a desktop, laptop), a handheld device (e.g., an iPad, a phone, an emailing device, etc.), or any other communication device that is capable of transmitting information.

In some embodiments, a user (e.g., an administrator) may program a behavior of the switch device 12 using the controller 50. In other embodiments, there may be one or more devices 52 (e.g., computers, handheld devices) that are communicatively coupled to the controller 50. In such cases, each user of the device(s) 52 may communicate with the switch device 12 through the controller 50, and is configured to program a behavior of the switch device 12 through an openflow protocol. Also, in some embodiments, the controller 50 or any of the device(s) 52 that is communicating with the controller 50 may be considered a user. Thus, as used in this specification, the term "user" may refer to a device, or a person using the device.

In the illustrated embodiments, the network 10 may also include different network users 80a-80c that are communicatively coupled to the switch device 12 through an access point 82. Although three network users 80a-80c are shown, in other embodiments, there may be fewer than three network users 80 or more than three network users 80. The access point 82 may be any device that is capable of receiving input from multiple users and transmitting information to the switch device 12. By means of non-limiting examples, the access point 82 may be a WiFi device, a wireless device, a switch, etc. In other embodiments, the access point 82 may not be included, in which cases, the users 80a-80c may communicate with the switch device 12 without using the access point 82. In some embodiments, each network user 80 may be a computer (e.g., a desktop, laptop), a handheld device (e.g., an iPad, a phone, an emailing device, etc.), or any other communication device that is capable of transmitting information.

The network 10 may also include server(s) 90 that is communicatively coupled to the switch device 12. Each server 90 may communicate with the switch device 12 through an openflow protocol. In some embodiments, each user 90 may be a computer (e.g., a desktop, laptop), or any other communication device that is capable of transmitting information. In the illustrated figure, each "openflow" element may be a switch device (like the switch device 12), and may be an openflow switch.

It should be noted that the devices that may communicate with the switch device 12 are not limited to the examples shown in the network 10, and that there may be other device(s) that are in communication with the switch device 12. One or more of the devices may directly communicate with the switch device 12, or may communicate indirectly with the switch device 12 through one or more access point(s). Furthermore, the communicative coupling between the switch device 12 and the controller 50, between the switch device 12 and the network users 80, between the switch device 12 and the servers 90, and/or between the switch device 12 and the nodes 22, may be implemented using a wireless link, a wired channel, or both. In some embodiments, any of the communicative couplings described above may be implemented using the Internet. Also, in some embodiments, the switch device 12 may include software 90 in a non-transitory medium for implementing a secure channel that connects the switch device 12 to the controller 50, thereby allowing commands and packets to be sent between the switch device 12 and controller 50.

As shown in FIG. 1, the switch device 12 includes hardware 100 for implementing data path, and software 102 in a non-transitory medium for implementing control path. By means of non-limiting examples, the hardware 100 may be one or more hardware chips, such as general processor(s), ASIC(s) or FPGA(s). The control path may be implemented via the software 102 running on a CPU that communicates with the data path's hardware 100 to configure flow-tables in the switch device 12, which may be in the form of TCAMs associated with ASICs or FPGAs. Once a TCAM table is set up by the software, packets along the data path may be forwarded via the hardware chips at line rate.

In some embodiments, the flow table 60 in the switch device may be set up using the hardware 100 and software 102 based on standard protocols. As used in this specification, the term standard protocol, or similar term, refers to a network transmission protocol that has been set up and established by a standard setting organization, and has been used by existing commercially available network devices (e.g., network switches) for transmitting network data. Also, in some embodiments, the flow table 60 may be configured based on an openflow protocol. For example, such may be accomplished by the controller 50, which accesses the switch device 12 through the openflow protocol, and program the switch device 12 to behave in a certain desired manner. The programming of the switch device 12 may involve adding information, deleting information, modifying information, etc., in the flow table 60. For example, the controller 50 may be a computer running a flow control application software for configuring the flow table 60 in the switch device 12.

In some embodiments, the switch device 12 may be a hybrid openflow switch device (or openflow-enabled switch or router). In such cases, the switch device 12 has flow entries in the flow table(s) 60 that forward packets through non-traditional packet processing paths (e.g., through the openflow protocol), and other flow entries in the flow table(s) 60 that forward packets through the traditional packet processing paths (e.g., based on traditional/standard protocol). Thus, using a hybrid openflow switch device, specific flows that are of interest to the openflow user (e.g., controller 50, or one or more users communicating with the controller 50) may be processed one way, while the rest of the flows may be processed in a traditional way. In other embodiments, the switch device 12 may be a dedicated openflow switch device. In such cases, the switch device 12 performs switching and/or routing functions completely based on the openflow protocol, and all flow table entries are controlled by one or more openflow users (e.g., controller 50, or one or more users communicating with the controller 50).

As illustrated, the openflow protocol provides an open and standard way for a user (e.g., the controller 50, etc.) to communicate with the switch device 12. This is advantageous over existing switches or routers that do not allow network administrator to modify the flow tables directly. Using the openflow protocol, an administrator (e.g., a user) may modify a flow table through the controller 50. In some embodiments, the openflow protocol may provide network simplification for certain types of traffic, as identified by the openflow user(s) (e.g., controller 50, one or more users communicating with the controller 50). For example, the switch device 12 running on openflow protocol may simplify the flow of traffic at the edge of a network before the traffic enters the transport rings. The switch device 12 may also allow experimental traffic to be mixed in a production network, yet being handled separately by the openflow user(s), such as assigning them to a special VLAN using the flow table(s) 60 in the switch device 12. Also, in some embodiments, the switch device 12 operating based on the openflow protocol may forward packets in ways that are not determined by any standard routing or switching protocols.

Although only one switch device 12 is shown in the network 10 of FIG. 1, in other embodiments, the network 10 may include a plurality of switch devices 12, each of which may be communicatively coupled to one or more openflow device(s) (e.g., controller 50).

In some embodiments, a network appliance may be employed to provide traffic visibility for the network having traffic passing through one or more openflow network equipment (such as the switch device 12). Such network appliance may identify all traffic controlled by the openflow protocol, e.g., traffic controlled by the openflow device(s) (e.g., controller 50), such that packets transmitted under the openflow protocol may be copied to the appropriate instruments (tools) for analysis.

Figure 2:
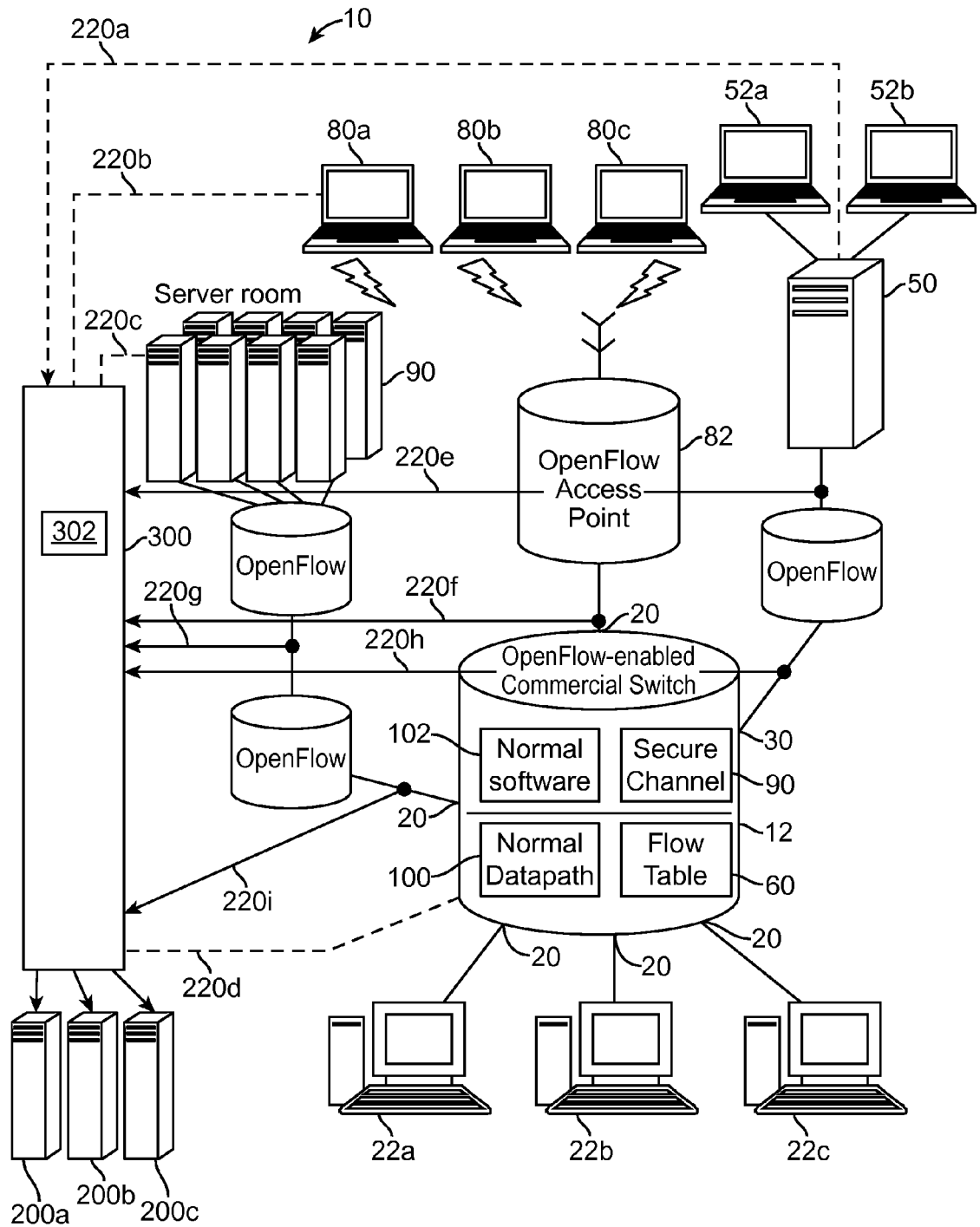
FIG. 2 illustrates a network appliance deployed in a network environment in accordance with some embodiments.

FIG. 2 illustrates a network appliance 300 that may be used with the network 10 of FIG. 1 in accordance with some embodiments. The network appliance 300 may be considered to be a part of the network 10 in accordance with some embodiments. As shown in the figure, the network appliance 300 is communicatively coupled to the various network devices in the network 10 during use. Although the network appliance 300 is illustrated as communicatively coupled to only one switch device 12, in other embodiments, the network appliance 300 may be communicatively coupled to a plurality of switch devices 12. As shown in the figure, the network appliance is also communicatively coupled to different instruments 200a-200c during use. The instrument 200 may be a non-pass through device (i.e., it can only receive packets intended to be communicated between two nodes, and cannot transmit such packets downstream), such as a sniffer, a network monitoring system, an application monitoring system, an intrusion detection system, a forensic storage system, an application security system, etc., or the instrument may be a pass-through device (i.e., it can receive packets, and transmit the packets back to the network appliance 300 after the packets have been processed), such as an intrusion prevention system. In some embodiments, the instrument 200 may also be an application response time monitor. The network appliance 300 is configured to receive packets from the switch device 12 (wherein such packets may be transmitted from a source node to a destination node via the switch device 12), and transmit the packets to the appropriate instruments 200a-200c for analysis.

In addition to receiving packets from the switch device 12, the network appliance 300 is also configured to receive information regarding a programmed behavior of the switch device 12. In particular, the network appliance 300 includes a module 302 configured to receive various information from or within the network 10, and process the information. The module 302 may be implemented using hardware, software, or combination of both. For example, in some embodiments, the module 302 may be a processor running on software. The processor may be a general purpose processor, an ASIC processor, or any other types of processor that is capable of performing data processing.

In the illustrated embodiments, the network appliance 300 (e.g., the processor therein) is configured for accessing the network 10, and obtaining information regarding the programmed behavior of the switch device 12 (which may be programmed by the controller 50, or by one or more users 52a, 52b communicating with such controller 50). By means of non-limiting examples, the information from the network 10 may include command(s) transmitted from an openflow protocol device(s) (e.g., controller 50) to the switch device 12, information stored in the switch device 12 (such as data in flow table(s) 60, metadata for the flow table(s) data, packet information, etc.), data regarding the controller 50, etc.), or combination of the foregoing. Also, in another example, the information from the network 10 may also include data regarding any event concerning the addition or deletion of flow information as communicated via the openflow protocol. For example, if a flow is detected from a flow table in accordance with an openflow instruction transmitted from the controller 50, the network appliance 300 will receive data regarding such even, and will then know about it. By knowing how the switch device 12 is configured by the openflow user(s), the network appliance 300 may be employed to provide traffic visibility for the network 10 having traffic passing through the switch device 12. For example, the network appliance 300 may identify traffic controlled by the openflow device(s) (e.g., controller 50) such that packets transmitted under the openflow protocol may be copied to the appropriate instruments (tools) 200 for analysis.

The network appliance 300 may access the network 10 using different techniques in different embodiments. In some embodiments, the network appliance 300 (e.g., the processor therein) may access the network 10 by accessing the openflow controller 50. For example, the network appliance 300 may access the controller 50 through communication channel 220a. Once the controller 50 is accessed, the network appliance 300 may then obtain the information regarding the programmed behavior of the switch device 12. For example, the processor in the network appliance 300 may be configured for obtaining the information from the controller 50 by transmitting a query to the controller 50, and receiving the information from the controller 50. In some embodiments, the query from the network appliance 300 may be implemented through a SNMP MIB. In other embodiments, the network appliance 300 may also access the user 80 through communication channel 220b, or may access the server(s) 90 through communication channel 220c, to thereby obtain certain information regarding these devices, and/or network communication with these devices.

In other embodiments, one or more openflow devices (e.g., controller 50) may be configured to transmit the information to the network appliance 300 using a push technology. In such cases, the network appliance 300 (e.g., the processor therein)

may be configured to receive the information that is transmitted from the openflow device(s) using the push technology. Also, in such cases, although the network appliance 300 is passive, the network appliance 300 is still considered as "accessing" the network 10 (i.e., in a passive manner).

In other embodiments, the network appliance 300 may access the switch device 12, and obtain the information regarding the programmed behavior of the switch device 12 from the switch device 12 itself. For example, the network appliance 300 may communicate with the switch device 12 through a communication channel 220*d*. The processor in the network appliance 300 may be configured for obtaining the information from the switch device 12 by transmitting a query to the switch device 12 through the channel 220*d*, and receiving the information from the switch device 12. The obtained information may be data in the flow table(s) in the switch device 12, and may include data created using the openflow protocol, data created using the standard protocol, or both. In some embodiments, the obtained information may also include statistics, system parameters, system configuration of the switch, etc.

In other embodiments, the switch device 12 may be configured to transmit the information to the network appliance 300 using a push technology. In such cases, the network appliance 300 (e.g., the processor therein) may be configured to receive the information that is transmitted from the switch device 12 using the push technology. Also, in such cases, although the network appliance 300 is passive, the network appliance 300 is still considered as "accessing" the network 10 (i.e., in a passive manner).

In one or more embodiments, the transmission of the information regarding the programmed behavior of the switch device 12 may be prescribed by the openflow protocol. For example, the same openflow protocol that provides open access for the openflow user(s) may prescribe that the openflow user(s) transmit the information to the network appliance 300 when configuring the switch device 12 through the openflow interface. Similarly, the openflow protocol may prescribe that the switch device 12 transmits the information regarding its programmed behavior to the network appliance 300 when the switch device 12 receives a command from the openflow user(s) (e.g., the controller 50). Thus, the processor in the network appliance 300 may be configured for receiving the information that is transmitted from the openflow user(s) and/or from the switch device 12 based on the openflow protocol, which prescribes the transmission of the information from the openflow user(s) or from the switch device 12 to the network appliance 300.

In further embodiments, the network appliance 300 may be coupled to receive information from any point along the communication path from the openflow user(s) (e.g., user 50, 80, or 90) to the switch device 12. For examples, the network appliance 300 may be coupled to the network 10 using any of the channels 220*e*-220*i*. It should be noted that the network appliance 300 may be considered as communicatively coupled to the controller 50 (i.e., indirectly) through either or both of the channels 220*e*, 220*h*. Similarly, the network appliance 300 may be considered as communicatively coupled to the device(s) 80 (i.e., indirectly) through the channel 220*f*. Also, the network appliance 300 may be considered as communicatively coupled to the server(s) 90 (i.e., indirectly) through the channel 220*g*.

In some embodiments, the switch device 12 may also transmit information to the openflow device(s) (e.g., controller 50). For example, the switch device 12 may transmit a confirmation that a certain command has been received from the openflow device(s), certain information regarding an entry in a flow table, etc. In such cases, the network appliance 300 may also obtain such information.

It should be noted that one or more of the channels 220*a*-220*h* may be an encrypted channel (path), in which cases, information transmitted therethrough will be encrypted. For example, in some embodiments, the communication paths from the openflow user(s) (e.g., controller(s) 50) to the switch device 12 may be encrypted. In such cases, if the network appliance 300 is configured to intercept the communication between the openflow user(s) and the switch device 12 (e.g., through one or more of the channels 220*e*-220*i*), the processor in the network appliance 300 may be configured for decrypting the communication transmitted from the openflow device(s) (e.g., device 50, 80, or 90). Similarly, one or more of the channels 220*a*-220*d* may be encrypted. In such cases, the processor in the network appliance 300 may be configured for decrypting the communication transmitted through these channels. Furthermore, information from one or more of the communication channels 220*a*-220*i* may be obtained through a XML interface. In some embodiments, one or more of the paths 220*a*-220*i* may be a dedicated path. In other embodiments, one or more of the paths 220*a*-220*i* may be part a communication path through which normal traffic is communicated in the network 10. In addition, one or more of the communication paths 220*a*-220*i* may be implemented through the Internet.

During use, the network appliance 300 receives packets (e.g., packets transmitted from a source node to a destination node via the switch device 12) from the network 10, and transmits them to the appropriate instruments 200 for analysis. In some embodiments, certain instrument(s) 200 communicatively coupled to certain instrument port(s) at the network appliance 300 may be dedicated for processing packets that are transmitted using standard protocol, while other instrument(s) 200 communicatively coupled to other certain instrument port(s) at the network appliance 300 may be dedicated for processing packets that are transmitted using openflow protocol. Also, an openflow user may prescribe certain types of packets to be transmitted differently from others under the openflow protocol, which may be different from the way the packets are transmitted under the standard protocol. Thus, in order for the network appliance 300 to know which instrument ports for transmitting the packets, the network appliance 300 may obtain information regarding the programmed behavior of the switch device 12, and may use the information to determine which instrument port(s) to output the packets. In some embodiments, after the network appliance 300 receives the information regarding the programmed behavior of the switch device 12 from the network 10, the network appliance 300 (e.g., the processor therein), or a user of the network appliance 300, may configure a component in the network appliance 300 using the obtained information. In some embodiments, the component may be one or more entries in a flow table that is stored in a non-transitory medium in the network appliance 300. In other embodiments, the component may be a filter, or a flow mapping, etc. In some embodiments, the processor of the network appliance 300 may configure the component by creating filter(s), creating flow mapping(s), or both. The created filter(s) and/or flow mapping(s) may be stored in the non-transitory medium in the network appliance 300 in some embodiments. The configured component in the network appliance 300 allows the network appliance 300 to transmit the packets to the various appropriate instruments through different instrument ports for analysis.

It should be noted that the component(s) that may be configured by the processor/user is not limited to the examples described, and that the processor/user may configure any component(s) in the network appliance 300 to handle openflow traffic, such as for isolating openflow traffic, or subset(s) of the openflow traffic, excluding the OpenFlow traffic, and/or delivering openflow traffic to one or more tool(s). By means of non-limiting examples, the network appliance 300 may have one or more of the following components that may be configured to handle openflow traffic: ingress filter(s), egress filters(s), flow map(s), Pass-All filter(s), simple connections module, time-stamping module, port-labeling module, packet de-duplication module, etc. For example, the user of the network appliance 300 may enter the following instructions for configuring the network appliance 300 (e.g., components in the network appliance 300):
(1) Deliver all openflow traffic to a particular set of tools through a particular set of instrument ports.
(2) Deliver all traffic except the openflow traffic to a particular set of tools through a particular set of instrument ports.
(3) Isolate particular subset(s) of the openflow traffic and deliver to a particular set of tools through a particular set of instrument ports.
(4) Count the openflow traffic (e.g., using technology employed in GigaSMART), and generate alert or alarms if there is any anomaly.
(5) Timestamp, port-label, and perform packet de-duplication in the above cases.
(6) Label all packets that belong to openflow with a tag before delivering them to a set of tools through a particular set of instrument ports. In this case the traffic going to this set of tools may contain the non-openflow traffic as well.

In some embodiments, there may be multiple network appliances 300 that are stacked together or connected via tunnels across the Internet. Hence traffic identified by one network appliance 300 may be delivered to a different network appliance 300, either through stacking links, or through tunneling across the Internet.

In one implementation, the switch device 12 is configured to support a query from the network appliance 300, and that the network appliance 300 and the switch device 12 authenticate each other before information (e.g., information in the flow table(s) 60) is transmitted from the switch device 12 to the network appliance 300. For example, the openflow protocol may support a SNMP MIB for querying the flow table(s) 60, in which cases, the network appliance 300 may query for such table(s) 60 in the switch device 12. Once the network appliance 300 knows the flow table(s) 60 inside the switch device 12, the network appliance 300 (e.g., the processor therein) may indentify the matching criteria of each flow entry, and then set up its own filters and flow mapping entries. In some embodiments, the matching criteria may be based on the configuration set up by the user of appliance 300, as described previously. The user may set up very high level configuration instructions, and the rest may be automatic. In some embodiments, the configuration instruction may be a general or high level instruction, such as, "Take all OpenFlow data to a particular set of tools." In other embodiments, the configuration instruction may be more specific, such as "Take all OpenFlow traffic to destination IP address 10.2.3.4 to a particular set of tools".

In another implementation, the network appliance 300 may be configured to intercept the communications between the openflow user(s) (e.g., controller 50) and the switch device(s) 12 to understand what flow entries the openflow user(s) is setting up on a particular switch device. In some cases, the communication between the switch device 12 and its openflow user(s) is encrypted, and the network appliance 300 is configured to support certificates so that it can decrypt the communications between the switch device 12 and the openflow user(s). In some embodiments, the module 302 of the network appliance 300 is configured to understand the openflow protocol, so that it can translate the findings (e.g., the obtained information from the network 10) for setting up its own filters and map-rules. This allows a rule, such as, "Transmit all openflow traffic set up by a particular controller on openflow switch 12 to a particular set of tools" to be set up.

In another implementation, the openflow protocol may have an extension that, for every flow entry to be created on the switch device 12, a notification be sent to the network appliance 300 so that it knows how to set up its filters and map-rules for monitoring packet flows. By means of non-limiting example, the notification information may include an identification of the switch device 12 that is being configured through an openflow protocol, an identification of ingress port(s) at the network appliance 300 that will receive the data traffic based on a change in an openflow entry in the flow table 60, etc. Alternatively, the notification may not include the above information, but may include data for allowing the above information to be derived. In some embodiments, the network appliance 300 may be configured for obtaining such information through a XML interface or any other software interface.

In further embodiments, the network appliance 300 may have an open interface to one or more of the openflow user(s) or switch device(s) 12, such that the network appliance 300 knows how a packet is being "specially processed" under the openflow protocol. This can be done via a query to the switch device 12 or to the openflow user, or via a push technology from the openflow user to the network appliance 300. Such allows the network appliance 300 to pin point whether the behavior of the traffic is in accordance with the configuration settings in one or more of the switch device(s) 12, and/or the applications running on their respective openflow users (e.g., controllers 50, etc.).

In some embodiments, the network appliance 300 (e.g., the processor therein) may be configured for using the information to determine whether a packet transmission is based on a traditional protocol or based on a non-traditional protocol (e.g., based on an openflow protocol). In the illustrated embodiments, the switch device 12 may be configured both based on traditional protocol and based on openflow protocol. As a result, the flow table in the switch device 12 may include entries that are programmed through traditional protocol (e.g., by a provider or a network administrator of the switch device 12), as well as entries that are programmed through the openflow protocol. Because information regarding the programmed behavior of the switch device 12 is transmitted to the network appliance 300, the network appliance 300 may use such information to determine if certain information in the flow table of the switch device 12 is due to configuration through non-traditional protocol. In some embodiments, the processor of the network appliance 300 may be configured (e.g., programmed and/or built) to process the information based on the openflow protocol, so that it can understand the received information, and perform the desired analysis and/or packet forwarding based on the received information.

In some embodiments, the network appliance 300 may be used to provide management between different openflow devices (e.g., openflow users, switch device(s) 12, etc.). In some cases, flow tables in the switch device 12 may be implemented using TCAM. However, in such technique, there may be no partition between one user's flow entries versus another user's flow entries within the same TCAM. Therefore it is possible that one user's flow entries, as configured via the openflow protocol, may change the outcome of a search on other flow entries (which may be configured via the openflow protocol by another openflow user, or under the standard protocol) by the switch device 12. For example, when a packet enters the switch device 12, the switch device 12 may perform a search, such as a "look-up" (e.g., in the TCAM), to find out whether there is a flow entry for the packet, and from this flow entry, the switch device 12 may find out what is the next forwarding step. In some embodiments, the search may be done automatically by a switch chip inside the switch device 12. This search (e.g., look-up) may have undesired results if one flow entry from a different openflow user somehow matches, and has a higher priority in the TCAM. This is because in some cases, arbitrarily adding or deleting flow entries from one openflow user's perspective may create holes in the flow table such that it affects the search priority of another openflow user's flow entries. This situation will get worst if more than one openflow users (e.g., multiple controllers 50) can access the same switch device 12. If the openflow users are not aware of each other, conflicts at the flow tables may arise. In some embodiments, based on the information obtained from the network (e.g., the controller 50), the network appliance 300 may be configured to identify all or a subset of the openflow traffic, including information regarding which user sets up which openflow traffic, etc. This way, the network appliance 300 may assist the user of the network appliance 300 to identify network issues associated with the openflow protocol (e.g., TCAM issues).

In some embodiments, the network appliance 300 may be configured to identify the communication traffic between one or more openflow user(s) and a plurality of switch devices 12 such that special applications in the network appliance 300 may be set up to monitor the bandwidth utilization of such traffic on a per switch device basis and as an accumulated pipe. This may help a network administrator to decide whether a particular openflow device is being overwhelmed. In one example, the openflow device that is overwhelmed may be the switch 12 itself with many flow entries configured by various openflow users. In another example, the openflow device that is overwhelmed may be a communication path (e.g., a secured communication path between the openflow switch 12 and the controller, which may be overwhelmed due to new packets being copied to the controller from the switch device 12). In one implementation, the processor in the network appliance 300 may be configured for establishing a plurality of communication links an additional openflow user and an additional switch device 12 (which may be considered an additional network), wherein the additional openflow user is communicatively coupled to the additional switch device 12, and is configured to program a behavior of the additional switch device 12 through the openflow protocol. In such cases, the network appliance 300 (e.g., the processor therein) may be configured for obtaining additional information regarding the programmed behavior of the additional switch device 12, and for monitoring bandwidth utilization of traffic through the network (that includes the first switch device 12) and the additional network (that includes the second switch device 12) using the information and the additional information. The above features allow the network appliance 300 to monitor the bandwidth utilization of the traffic between a switch device and the openflow user(s) that controls the switch device. This may be excessive if an openflow device is deployed in a high bandwidth pipe and the first packets of all new flows are copied to an openflow user (e.g., controller 50) for decision on whether to create new flow entries or not. There may be various reasons why the switch device 12 (or another network device) may forward packets to the controller 50. For example, in some embodiments, based on an openflow protocol requirement, the controller 50 may be interested in deciding what to do with a new packet that it sees entering the switch device 12. Hence, a packet may be sent from the switch device 12 to the controller 50. In response to receiving the packet, the controller 50 may instruct the switch device 12 to set up a new flow entry in the switch device 12, or it may tell the switch device 12 to forward this packet in the traditional way using standard protocols.

As illustrated in the above embodiments, the network appliance 300 is advantageous because it provides visibility for data traffic that is controlled via an openflow protocol. Packets entering a switch device may be processed differently, depending whether the switch device is processing the packets based on traditional protocol or openflow protocol. If one is tapping the traffic from the network 10 that includes the switch device 12, there is no special header or labeling to identify whether the packets is processed based on traditional protocol or openflow protocol. If something goes wrong with the openflow application at the openflow user (e.g., the controller 50), and affects the traffic, a network administrator may not be able to isolate the openflow traffic to check whether a particular openflow user or a flow table in a switch device it configures is at fault. The network appliance 300 may be used to address the foregoing problems in some embodiments because it knows how the switch device 12 is programmed based on the information received from the network 10.

The network appliance 300 is also advantageous because it may be used to manage the different openflow devices (e.g., the controller 50, openflow switch devices 12, etc.). For example, in some embodiments, the network appliance 300 may be configured to obtain the status of an openflow switch device, information in the flow tables in the switch device, as well as status and information from the openflow user(s) (e.g., the controller 50).

The network appliance 300 is also advantageous because it may monitor communications in the network 10 in order to provide security for the openflow user(s) (e.g., user 50, 80, or 90). In the openflow environment, the openflow user may control the flow tables of multiple openflow switch devices. From a security's perspective, the damage is huge if an openflow user is compromised. Production traffic may get shunt out, or get copied to some bogus locations, or being looped around to bring down the network.

Figure 3:
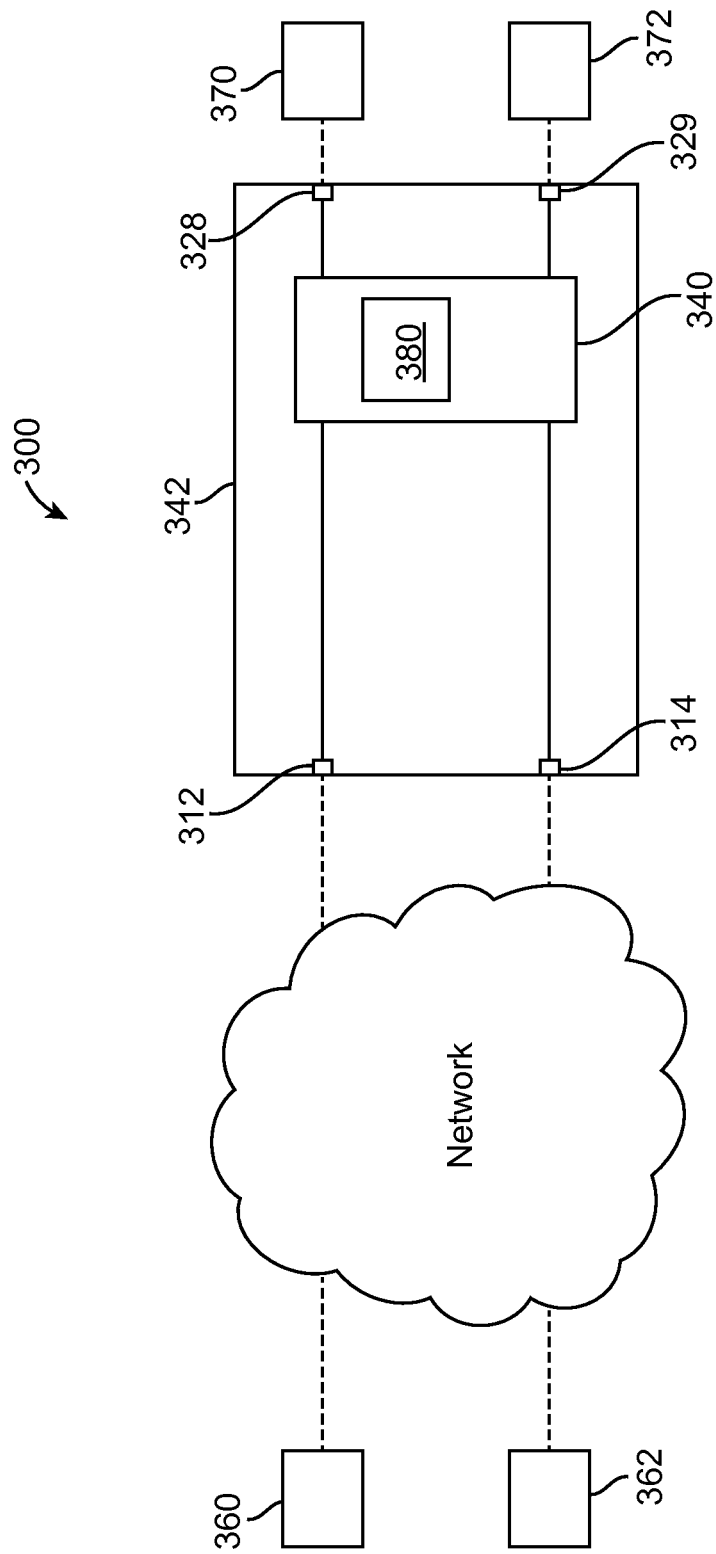
FIG. 3 illustrates the network appliance in accordance with some embodiments.

FIG. 3 illustrates a network appliance 300 in accordance with some embodiments. The network appliance 300 may be an example of the network appliance 300 of FIG. 2 in accordance with some embodiments. The network appliance 300 includes a first network port 312, a second network port 314, a first instrument port 328, and a second instrument port 329. The network appliance 300 also includes a packet switch 340, and a network switch housing 342 for containing the packet switch 340. In the illustrated embodiments, the network appliance 300 also includes other components, such as a Network PHY (not shown) coupled to each of the respective ports 312, 314, wherein the Network PHYs may be considered to be parts of the packet switch 340. Alternatively, the Network PHYs may be considered to be components that are separate from the integrated circuit 340. The PHY is configured to connect a link layer device to a physical medium such as an optical fiber, copper cable, etc. In other embodiments, instead of the PHY, the network appliance 300 may include an optical transceiver, or a SERDES, etc. The housing 342 allows the network appliance 300 to be carried, transported, sold, and/or operated as a single unit. The ports 312, 314, 328, 329 are located at a periphery of the housing 342. In other embodiments, the ports 312, 314, 328, 329 may be located at other locations relative to the housing 342. Although two network ports 312, 314 are shown, in other embodiments, the network appliance 300 may include more than two network ports. Also, although two instrument ports 328, 329 are shown, in other embodiments, the network appliance 300 may include only one instrument port, or more than two instrument ports.

During use, the first network port 312 of the network appliance 300 is communicatively coupled to a first node 360, and the second port 314 is communicatively coupled to a second node 362. The network appliance 300 is configured to communicate packets between the first and second nodes 360, 362 via the network ports 312, 314. Also, during use, the instrument ports 328, 329 of the network appliance 300 are communicatively coupled to respective instruments 370, 372. The instruments 370, 372 may be directly coupled to the network appliance 300, or communicatively coupled to the network appliance 300 through the network (e.g., Internet). In some cases, the network appliance 300 is provided as a single unit that allows the network appliance 300 to be deployed at a single point along a communication path. In the illustrated embodiments, the packet switch 340 is configured to receive packets from nodes 360, 362 via the network ports 312, 314, and process the packets in accordance with a predefined scheme. For example, the packet switch 340 may pass packets received from one or more nodes to one or more instruments that are connected to respective instrument port(s) 328, 329.

In one or more embodiments, the packet switch 340 may be any switch module that provides packet transmission in accordance with a pre-determined transmission scheme. In some embodiments, the packet switch 340 (e.g., one or more components, such as component 380, in the packet switch 340) may be user-configurable such that packets may be transmitted in a one-to-one configuration (i.e., from one network port to an instrument port). As used in this specification, the term "instrument port" refers to any port that is configured to transmit packets to an instrument, wherein the instrument may be a non-pass through device (i.e., it can only receive packets intended to be communicated between two nodes, and cannot transmit such packets downstream), such as a sniffer, a network monitoring system, an application monitoring system, an intrusion detection system, a forensic storage system, an application security system, etc., or the instrument may be a pass-through device (i.e., it can receive packets, and transmit the packets back to the network appliance 300 after the packets have been processed), such as an intrusion prevention system. In some embodiments, the instrument may also be an application response time monitor. In other embodiments, the packet switch 340 may be configured such that the packets may be transmitted in a one-to-many configuration (i.e., from one network port to multiple instrument ports). In other embodiments, the packet switch 340 may be configured such that the packets may be transmitted in a many-to-many configuration (i.e., from multiple network ports to multiple instrument ports). In further embodiments, the packet switch 340 may be configured such that the packets may be transmitted in a many-to-one configuration (i.e., from multiple network ports to one instrument port). In some embodiments, the one-to-one, one-to-many, many-to-many, and many-to-one configurations are all available for allowing a user to selectively configure the network appliance 300 so that the packets (or certain types of packets) are routed according to any one of these configurations. In some embodiments, the packet movement configuration is predetermined such that when the network appliance 300 receives the packets, the network appliance 300 will automatically forward the packets to the ports based on the predetermined packet movement configuration (e.g., one-to-one, one-to-many, many-to-many, and many-to-one).

In accordance with some embodiments, the packet switch 340 may have the functionalities of a conventional packet switch except that it provides visibility into various parts of a network. Thus, embodiments of the packet switch 340 may operate like a conventional managed packet switch, but providing packet monitoring function. This is accomplished by configuring the packet switch 340 to operate as a circuit switch under certain circumstances. In some embodiments, the configuring of the managed packet switch may be performed by utilizing a CPU interface of the switch to modify appropriate registers in the switch to allow for the desired operation.

It should be noted that the packet switch 340 that may be used with the network appliance 300 is not limited to the examples described above, and that other packet switches 340 with different configurations may be used as well. Also, in any of the embodiments described herein, the packet switch 340 may be implemented using an integrated circuit, such as a processor (e.g., a general purpose processor, a network processor, an ASIC processor, a FPGA processor, etc.).

In the illustrated embodiments, the network appliance 300 also includes a component (e.g., an integrated circuit) 380 for performing various network processing functions. In the illustrated embodiments, the integrated circuit 380 is illustrated as a component of the packet switch 340. In other embodiments, the integrated circuit 380 may be a separate component from the packet switch 340. The integrated circuit 380 may be implemented using a processor, such as a general processor, a network processor, an ASIC processor, a FPGA processor, etc. In some embodiments, the network component 380 may be processor, such as a multi-core processor. In other embodiments, the network component 380 may be a network card.

In some embodiments, the packet switch 340 is configured to make packet forwarding decision based on information obtained from the network 10. For example, in some embodiments, based on information obtained by the network appliance 300 from the network 10, the network appliance 300 may identify openflow packets, so that certain packets may be copied to the relevant tools 200 (e.g., the network appliance 300 may be configured to transmit openflow packets to certain tool(s), exclude openflow packets to certain tool(s), etc.). In some embodiments, based on the information obtained from the network 10, the packet switch 340 may add or delete a filter therein, and/or may modify a flow mapping therein, which may impact how a packet is to be forwarded.

Figure 4:
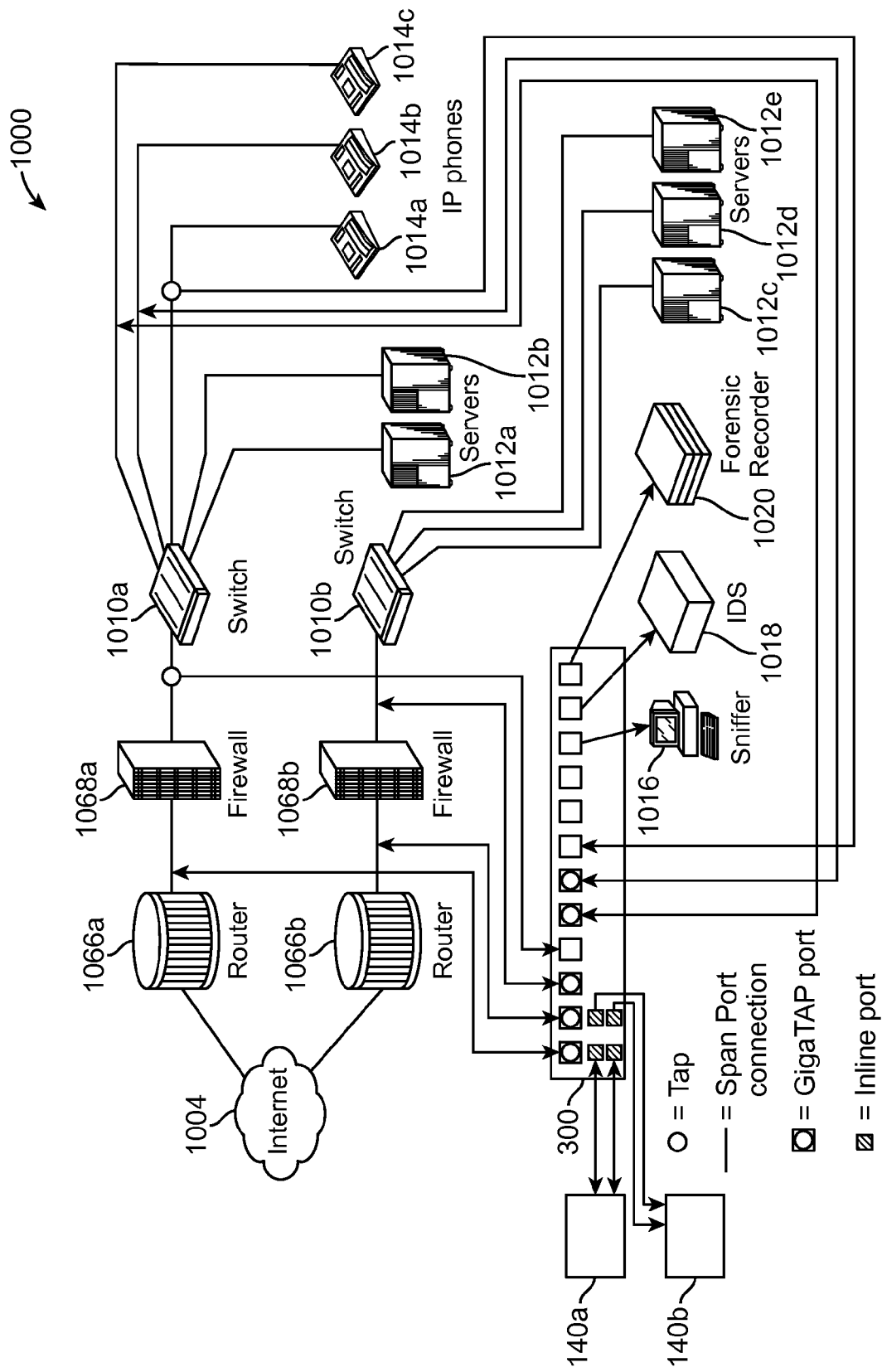
FIG. 4 shows an example of a deployment of the network appliance of FIG. 2 in a network environment in accordance with some embodiments.

FIG. 4 shows the deployment of the network appliance 300 in a network environment 1000 in accordance with some embodiments. The Internet 1004 is coupled via routers 1006a-b and firewalls 1068a-b to two switches 1010a and 1010b. Switch 1010a is coupled to servers 1012a-b and IP phones 1014a-c. Switch 1010b is coupled to servers 1012c-e. A sniffer 1016, an IDS 1018 and a forensic recorder 1020 (collectively, "non-pass through instruments") are coupled to the network appliance 300. As illustrated in FIG. 4, there is a reduction on the number of non-pass through instruments in this deployment as compared to a conventional configuration (in which there may be one or more non-pass through instruments between router 1066a and firewall 1068a, one or more non-pass through instruments between firewall 1068a and switch 1010a, one or more non-pass through instruments between router 1066b and firewall 1068b, and firewall 1068b and switch 1010b) because the same non-pass through instruments can now access information anywhere in the network environment 1000 through the network appliance 300. The user has complete flexibility to channel whatever traffic to whatever instrument or groups of non-pass through instruments, using the any-to-any, any-to-many and many-to-one capability of the system in accordance with the different embodiments described herein. For example, all the conversations of the IP phones 1014a-c can be easily configured to be sent to an IDS 1018. It is also possible that traffic inside a particular IP phone 1014a-c connection can be sent to a sniffer 1016, and Intrusion Detection System 1018 and a forensic recorder 1020 simultaneously via the one-to-many function.

In some embodiments, when using the network appliance 300, one or more non-pass through instruments (such as IDS, sniffer, forensic recorder, etc.) may be connected to instrument port(s), and one or more pass through instruments 140a, 140b (e.g., IPS) may be connected to other instrument port(s) (e.g., inline port(s)). Such configuration allows non-pass through instrument(s) and pass through instrument(s) to simultaneously monitor the network traffic. Each non-pass through instrument is in listening mode (i.e., it receives packets intended to be communicated between two nodes), and each pass through instrument is in pass-thru mode (i.e., it receives packets intended to be communicated between two nodes, processes them, and then pass the packets downstream towards the intended recipient node). In some cases, by having both an IDS and an IPS connected to the network appliance 300, the network appliance 300 can compare whether the IDS or the IPS sees more threats, and/or can have a redundant protection such that if the IPS misses any threat, the IDS may pick it up.

In some embodiments, any of the components in the network 1000 (such as the router 1066a/1066b, the firewall 1068a/1068b, switch 1010a/1010b, or server 1012a/1012b/1012c/1012d/1012e) may communicate with the switch device 12 using an openflow protocol, as similarly discussed with reference to FIG. 2. In general, any of the switches or routers may be configured to support, and hence, run the openflow protocol.

Computer System Architecture

Figure 5:
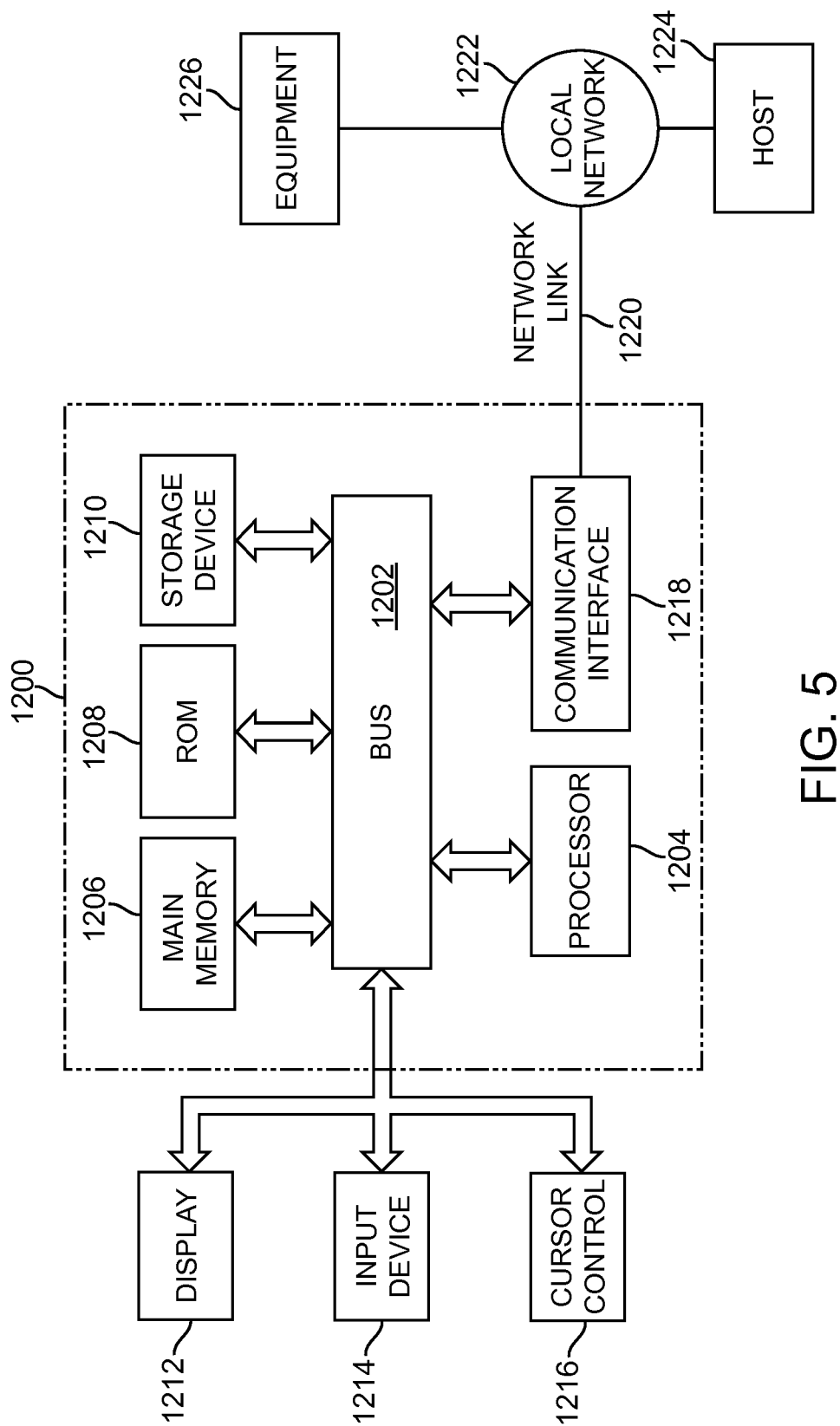
FIG. 5 illustrates an example of a computer system with which embodiments described herein may be implemented.

FIG. 5 is a block diagram that illustrates an embodiment of a computer system 1200 upon which embodiments described herein may be implemented. For example, in some embodiments, the computer system 1200 may be used to implement the controller 50, any of the devices 80a-80c, or the server 90, in the network 10 of FIG. 2. Computer system 1200 includes a bus 1202 or other communication mechanism for communicating information, and a processor 1204 coupled with the bus 1202 for processing information. The processor 1204 may be used to perform various functions described herein. For example, in some embodiments, the processor 1204 may receive input from a user for configuring a network component (e.g., the component 380).

The computer system 1200 also includes a main memory 1206, such as a random access memory (RAM) or other dynamic storage device, coupled to the bus 1202 for storing information and instructions to be executed by the processor 1204. The main memory 1206 also may be used for storing temporary variables or other intermediate information during execution of instructions to be executed by the processor 1204. The computer system 1200 further includes a read only memory (ROM) 1208 or other static storage device coupled to the bus 1202 for storing static information and instructions for the processor 1204. A data storage device 1210, such as a magnetic disk or optical disk, is provided and coupled to the bus 1202 for storing information and instructions.

The computer system 1200 may be coupled via the bus 1202 to a display 1212, such as a cathode ray tube (CRT) or a LCD monitor, for displaying information to a user. An input device 1214, including alphanumeric and other keys, is coupled to the bus 1202 for communicating information and command selections to processor 1204. Another type of user input device is cursor control 1216, such as a mouse, a trackball, or cursor direction keys for communicating direction information and command selections to processor 1204 and for controlling cursor movement on display 1212. This input device typically has two degrees of freedom in two axes, a first axis (e.g., x) and a second axis (e.g., y), that allows the device to specify positions in a plane.

The computer system 1200 may be used for performing various functions in accordance with the embodiments described herein. According to one embodiment, such use is provided by computer system 1200 in response to processor 1204 executing one or more sequences of one or more instructions contained in the main memory 1206. Such instructions may be read into the main memory 1206 from another computer-readable medium, such as storage device 1210. Execution of the sequences of instructions contained in the main memory 1206 causes the processor 1204 to perform the process steps described herein. One or more processors in a multi-processing arrangement may also be employed to execute the sequences of instructions contained in the main memory 1206. In alternative embodiments, hard-wired circuitry may be used in place of or in combination with software instructions to implement features of the embodiments described herein. Thus, embodiments described herein are not limited to any specific combination of hardware circuitry and software.

The term "computer-readable medium" as used herein refers to any medium that participates in providing instructions to the processor 1204 for execution. Such a medium may take many forms, including but not limited to, non-volatile media, volatile media, and transmission media. Non-volatile media includes, for example, optical or magnetic disks, such as the storage device 1210. A non-volatile medium may be considered to be an example of a non-transitory medium. Volatile media includes dynamic memory, such as the main memory 1206. A volatile medium may be considered to be another example of a non-transitory medium. Transmission media includes coaxial cables, copper wire and fiber optics, including the wires that comprise the bus 1202. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer-readable media may be involved in carrying one or more sequences of one or more instructions to the processor 1204 for execution. For example, the instructions may initially be carried on a magnetic disk of a remote computer. The remote computer can load the instructions into its dynamic memory and send the instructions over a telephone line using a modem. A modem local to the computer system 1200 can receive the data on the telephone line and use an infrared transmitter to convert the data to an infrared signal. An infrared detector coupled to the bus 1202 can receive the data carried in the infrared signal and place the data on the bus 1202. The bus 1202 carries the data to the main memory 1206, from which the processor 1204 retrieves and executes the instructions. The instructions received by the main memory 1206 may optionally be stored on the storage device 1210 either before or after execution by the processor 1204.

The computer system 1200 also includes a communication interface 1218 coupled to the bus 1202. The communication interface 1218 provides a two-way data communication coupling to a network link 1220 that is connected to a local network 1222. For example, the communication interface 1218 may be an integrated services digital network (ISDN) card or a modem to provide a data communication connection to a corresponding type of telephone line. As another example, the communication interface 1218 may be a local area network (LAN) card to provide a data communication connection to a compatible LAN. Wireless links may also be implemented. In any such implementation, the communication interface 1218 sends and receives electrical, electromagnetic or optical signals that carry data streams representing various types of information.

The network link 1220 typically provides data communication through one or more networks to other devices. For example, the network link 1220 may provide a connection through local network 1222 to a host computer 1224 or to equipment 1226 such as a radiation beam source or a switch operatively coupled to a radiation beam source. The data streams transported over the network link 1220 can comprise electrical, electromagnetic or optical signals. The signals through the various networks and the signals on the network link 1220 and through the communication interface 1218, which carry data to and from the computer system 1200, are exemplary forms of carrier waves transporting the information. The computer system 1200 can send messages and receive data, including program code, through the network(s), the network link 1220, and the communication interface 1218.

It should be noted that when a "packet" is described in this application, it should be understood that it may refer to the original packet that is transmitted from a node, or a copy of it.

It should be noted that the terms "first", "second", etc., are used to refer to different things, and do not necessarily refer to the order of things.

Although particular embodiments have been shown and described, it will be understood that they are not intended to limit the present inventions, and it will be obvious to those skilled in the art that various changes and modifications may be made without departing from the spirit and scope of the claimed inventions. The specification and drawings are, accordingly, to be regarded in an illustrative rather than restrictive sense. The present inventions are intended to cover alternatives, modifications, and equivalents, which may be included within the spirit and scope of the present inventions as defined by the claims.

What is claimed:

1. A method of monitoring network traffic, comprising:
    accessing a network that includes a controller and a switch device having a flow table, wherein the controller is communicatively coupled to the switch device, and is configured to program a behavior of the switch device through an openflow protocol; and
    obtaining information regarding the programmed behavior of the switch device;
    wherein the act of obtaining the information is performed by a network appliance that is communicatively coupled to the network, and that is separate from the controller configured to program the behavior of the switch device, the network appliance being configured to provide traffic visibility utilizing the openflow protocol.

2. The method of claim 1, wherein the act of accessing the network comprises accessing the switch device by the network appliance.

3. The method of claim 2, wherein the act of obtaining the information comprises:
    transmitting a query from the network appliance to the switch device; and
    receiving the information from the switch device.

4. The method of claim 3, wherein the obtained information comprises data in the flow table in the switch device.

5. The method of claim 3, wherein the query is implemented through a Simple Network Management Protocol (SNMP) Management Information Base (MIB).

6. The method of claim 3, further comprising configuring the network appliance using the obtained information.

7. The method of claim 6, wherein the act of configuring the network appliance comprises creating a filter, creating a flow mapping, or both.

8. The method of claim 1, wherein the act of accessing the network comprises accessing the controller by the network appliance.

9. The method of claim 8, wherein the act of obtaining the information comprises:
    transmitting a query from the network appliance to the controller; and
    receiving the information from the controller.

10. The method of claim 1, wherein the information is transmitted from the controller to the network appliance using a push technology.

11. The method of claim 1, wherein the obtained information comprises data in the flow table in the switch device.

12. The method of claim 1, further comprising configuring the network appliance using the obtained information.

13. The method of claim 12, wherein the act of configuring the network appliance comprises creating a filter, creating a flow mapping, or both.

14. The method of claim 1, wherein the switch device comprises an openflow switch or an openflow router.

15. The method of claim 1, wherein the switch device is a dedicated openflow switch or a dedicated openflow router.

16. The method of claim 1, wherein the switch device is a hybrid openflow switch or a hybrid openflow router.

17. The method of claim 1, wherein the network appliance comprises a module that is configured to process the information based on the openflow protocol.

18. The method of claim 1, further comprising:
    creating a filter using the information; and
    storing the created filter in a non-transitory medium in the network appliance.

19. The method of claim 1, further comprising:
    creating a flow mapping using the information; and
    storing the created flow mapping in a non-transitory medium in the network appliance.

20. The method of claim 1, wherein the information is obtained by the network appliance through an encrypted channel.

21. The method of claim 1, wherein the information is obtained by the network appliance through a XML interface.

22. The method of claim 1, further comprising using the information to determine whether a packet transmission is based on a traditional protocol or based on a non-traditional protocol.

23. The method of claim 22, wherein the non-traditional protocol comprises the openflow protocol.

24. The method of claim 1, wherein the information is transmitted from the controller or from the switch device to the network appliance based on the openflow protocol, which prescribes the transmission of the information from the controller or from the switch device to the network appliance.

25. The method of claim 1, wherein the act of obtaining the information comprises decrypting a communication between the controller and the switch device.

26. The method of claim 1, further comprising:
establishing an additional communication link involving an additional network that includes an additional controller and an additional switch device, wherein the additional controller is communicatively coupled to the additional switch device, and is configured to program a behavior of the additional switch device through the openflow protocol;
obtaining additional information regarding the programmed behavior of the additional switch device; and
monitoring bandwidth utilization of traffic through the network and the additional network using the information and the additional information, wherein the act of monitoring is performed by the network appliance.

27. An apparatus communicatively coupled to a network, comprising:
a processor configured for:
accessing the network that includes a controller and a switch device having a flow table, wherein the controller is communicatively coupled to the switch device, and is configured to program a behavior of the switch device through an openflow protocol; and
obtaining information regarding the programmed behavior of the switch device;
wherein the apparatus is separate from the controller that is configured to program the behavior of the switch device, and wherein the processor is configured to provide traffic visibility utilizing the openflow protocol.

28. The apparatus of claim 27, wherein the processor is configured for accessing the network by accessing the switch device.

29. The apparatus of claim 28, wherein the processor is configured for obtaining the information by:
transmitting a query to the switch device; and
receiving the information from the switch device.

30. The apparatus of claim 29, wherein the obtained information comprises data in the flow table in the switch device.

31. The apparatus of claim 29, wherein the query is implemented through a Simple Network Management Protocol (SNMP) Management Information Base (MIB).

32. The apparatus of claim 29, wherein the processor is further configured for configuring a component in the apparatus using the obtained information.

33. The apparatus of claim 32, wherein the processor configures the component by creating a filter, creating a flow mapping, or both.

34. The apparatus of claim 27, wherein the processor is configured for accessing the network by accessing the controller.

35. The apparatus of claim 34, wherein the processor is configured for obtaining the information by:
transmitting a query to the controller; and
receiving the information from the controller.

36. The apparatus of claim 27, wherein the processor is configured to receive the information that is transmitted from the controller using a push technology.

37. The apparatus of claim 27, wherein the obtained information comprises data in the flow table in the switch device.

38. The apparatus of claim 27, wherein the processor is further configured for configuring a component in the apparatus using the obtained information.

39. The apparatus of claim 38, wherein the processor configures the component in the apparatus by creating a filter, creating a flow mapping, or both.

40. The apparatus of claim 27, wherein the switch device comprises an openflow switch or an openflow router.

41. The apparatus of claim 27, wherein the switch device is a dedicated openflow switch or a dedicated openflow router.

42. The apparatus of claim 27, wherein the switch device is a hybrid openflow switch or a hybrid openflow router.

43. The apparatus of claim 27, wherein the processor is configured to process the information based on the openflow protocol.

44. The apparatus of claim 27, wherein the processor is further configured for creating a filter using the information; and
wherein the apparatus further comprises a non-transitory medium for storing the created filter.

45. The apparatus of claim 27, wherein the processor is further configured for creating a flow mapping using the information; and
wherein the apparatus further comprises a non-transitory medium for storing the created flow mapping.

46. The apparatus of claim 27, wherein the processor is configured for obtaining the information through an encrypted channel.

47. The apparatus of claim 27, wherein the processor is configured for obtaining the information through a XML interface.

48. The apparatus of claim 27, wherein the processor is further configured for using the information to determine whether a packet transmission is based on a traditional protocol or based on a non-traditional protocol.

49. The apparatus of claim 48, wherein the non-traditional protocol comprises the openflow protocol.

50. The apparatus of claim 27, wherein the processor is configured for receiving the information that is transmitted from the controller or from the switch device based on the openflow protocol, which prescribes the transmission of the information from the controller or from the switch device to the apparatus.

51. The apparatus of claim 27, wherein the processor is configured for decrypting a communication between the controller and the switch device.

52. The apparatus of claim 27, wherein the processor is further configured for:
establishing an additional communication link involving an additional network that includes an additional controller and an additional switch device, wherein the additional controller is communicatively coupled to the additional switch device, and is configured to program a behavior of the additional switch device through the openflow protocol;
obtaining additional information regarding the programmed behavior of the additional switch device; and
monitoring bandwidth utilization of traffic through the network and the additional network using the information and the additional information.

53. The method of claim 1, wherein the network appliance is configured to pass packets involved in the openflow protocol to one or more network monitoring instruments.

54. The method of claim 1, further comprising dynamically configuring the network appliance based on the information regarding the programmed behavior of the switch device.

55. The apparatus of claim 27, wherein the processor is configured to process packets involved in the openflow protocol for transmission to one or more network monitoring instruments.

56. The apparatus of claim 27, wherein the processor is configured to dynamically configure the apparatus based on the information regarding the programmed behavior of the switch device.

* * * * *